United States Patent [19]
Sakamoto

[11] Patent Number: 6,157,770
[45] Date of Patent: Dec. 5, 2000

[54] MOVING PICTURE DATA REPRODUCTION CONTROLLING SYSTEM AND METHOD FOR REPRODUCING MOVING PICTURE DATA HAVING BLOCK ELEMENTS AND MINIMUM ELEMENTS EACH WITH HEADERS

[75] Inventor: Hideo Sakamoto, Tokyo, Japan

[73] Assignee: NEC Corporation, Tokyo, Japan

[21] Appl. No.: 08/877,026

[22] Filed: Jun. 17, 1997

[30] Foreign Application Priority Data

Jun. 21, 1996 [JP] Japan .................................. 8-181165

[51] Int. Cl.⁷ .................................................. H04N 5/783
[52] U.S. Cl. ............................ 386/68; 386/111; 386/125; 348/7
[58] Field of Search .................................. 386/68, 6, 7, 8, 386/33, 81–82, 111–112, 125; 348/3, 7, 10, 15, 500, 512, 518; 358/135

[56] References Cited

U.S. PATENT DOCUMENTS

| | | | |
|---|---|---|---|
| 5,168,356 | 12/1992 | Acampora et al. | 358/135 |
| 5,594,482 | 1/1997 | O'Callaghan et al. | 348/10 |
| 5,712,976 | 1/1998 | Falcon, Jr. et al. | 348/7 |
| 5,737,531 | 4/1998 | Ehley | 395/200.38 |
| 5,764,298 | 6/1998 | Morrison | 348/12 |
| 5,801,781 | 9/1998 | Hiroshima et al. | 348/441 |
| 5,898,695 | 4/1999 | Fujii et al. | 348/10 |
| 5,900,904 | 5/1999 | Okada et al. | 348/7 |

FOREIGN PATENT DOCUMENTS

| | | |
|---|---|---|
| 0 460 764 A1 | 12/1991 | European Pat. Off. . |
| 7-030893 | 1/1995 | Japan . |
| 7-143477 | 6/1995 | Japan . |
| 7-222109 | 8/1995 | Japan . |
| 8-154230 | 6/1996 | Japan . |
| 2 268 661 | 1/1994 | United Kingdom . |
| 2 283 876 | 5/1995 | United Kingdom . |

*Primary Examiner*—Thai Tran
*Attorney, Agent, or Firm*—Foley & Lardner

[57] ABSTRACT

Moving picture data is supplied from a server to a system processing portion through a communication processing portion, a bus, and a line processing portion. Alternatively, the moving picture data may be sent directly to the line processing portion. Data received from the line processing portion is analyzed by a system processing portion. A system analyzing portion separates the data into header information and reproduced audio/video (A/V) data. The A/V data is temporarily stored in a storing unit. The A/V data is sent to a reproduction processing portion. The reproduction processing portion processes the A/V data and sends the resultant data to an external outputting unit through an output processing portion. The external outputting unit outputs the data as sound and picture. A monitoring unit detects the reproduction state of a moving picture in the state that a special reproduction mode such as a pause mode or a slow reproduction mode is changed to a normal reproduction mode, where the monitoring unit is disposed on a decode side.

16 Claims, 5 Drawing Sheets

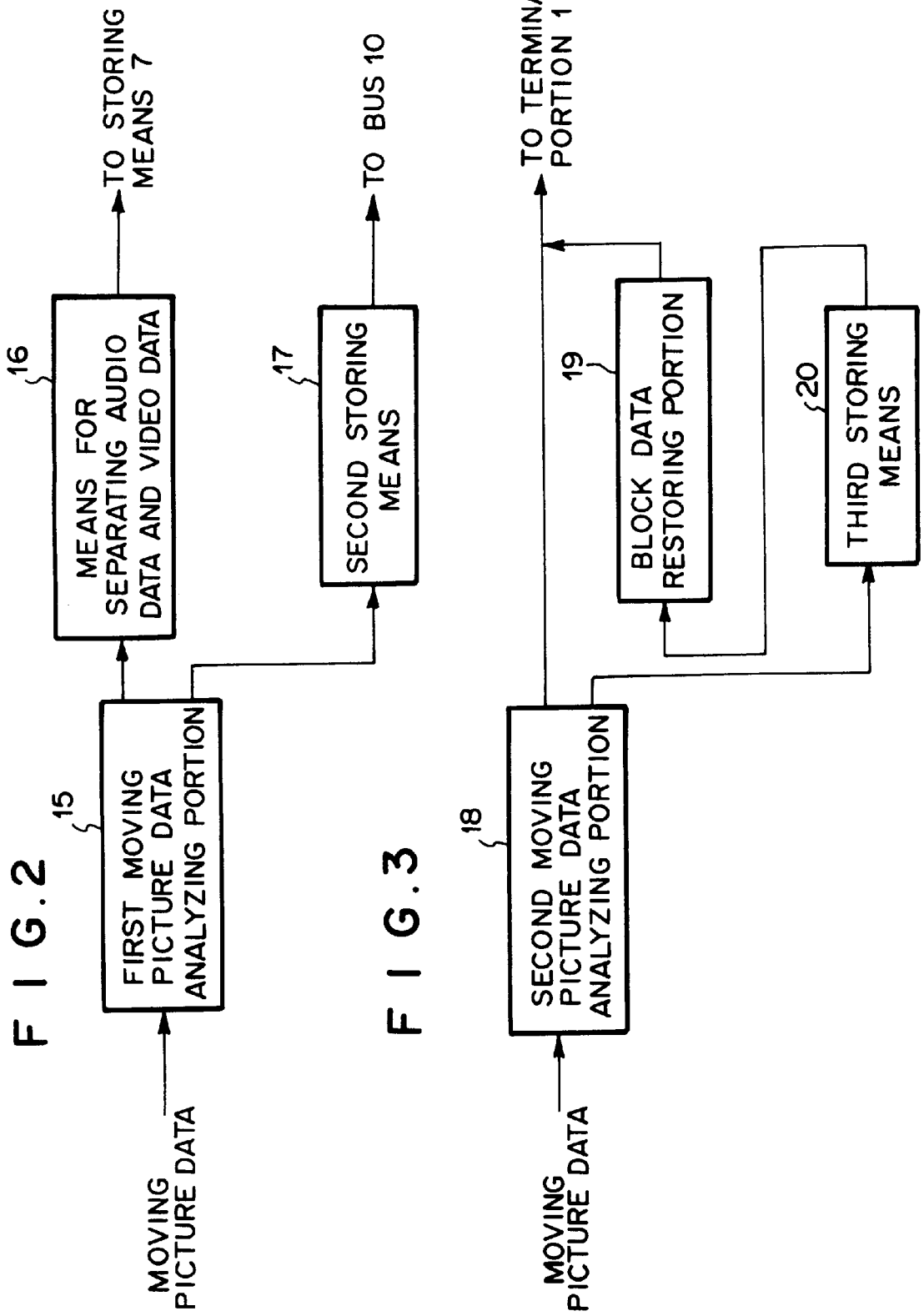

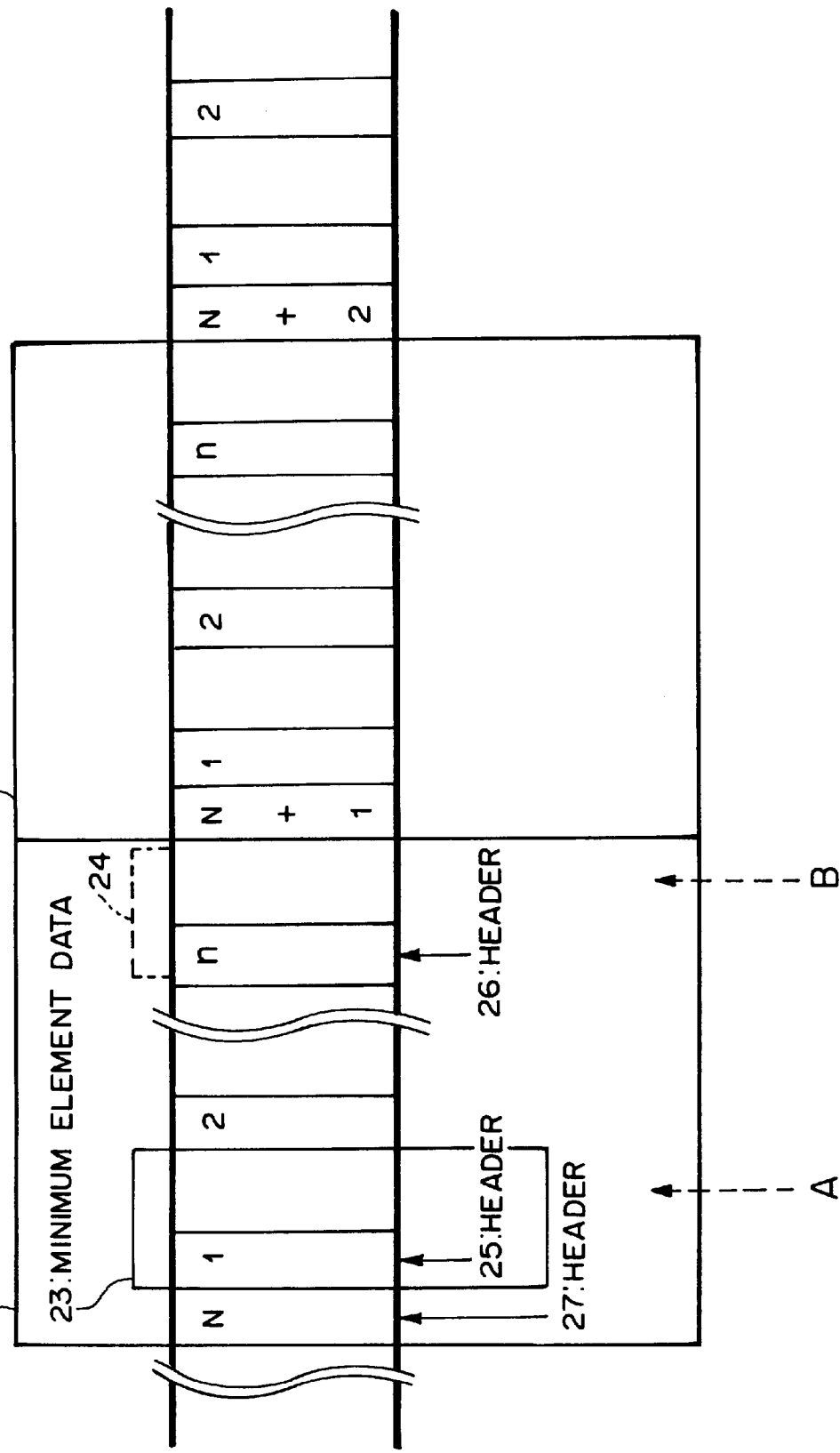

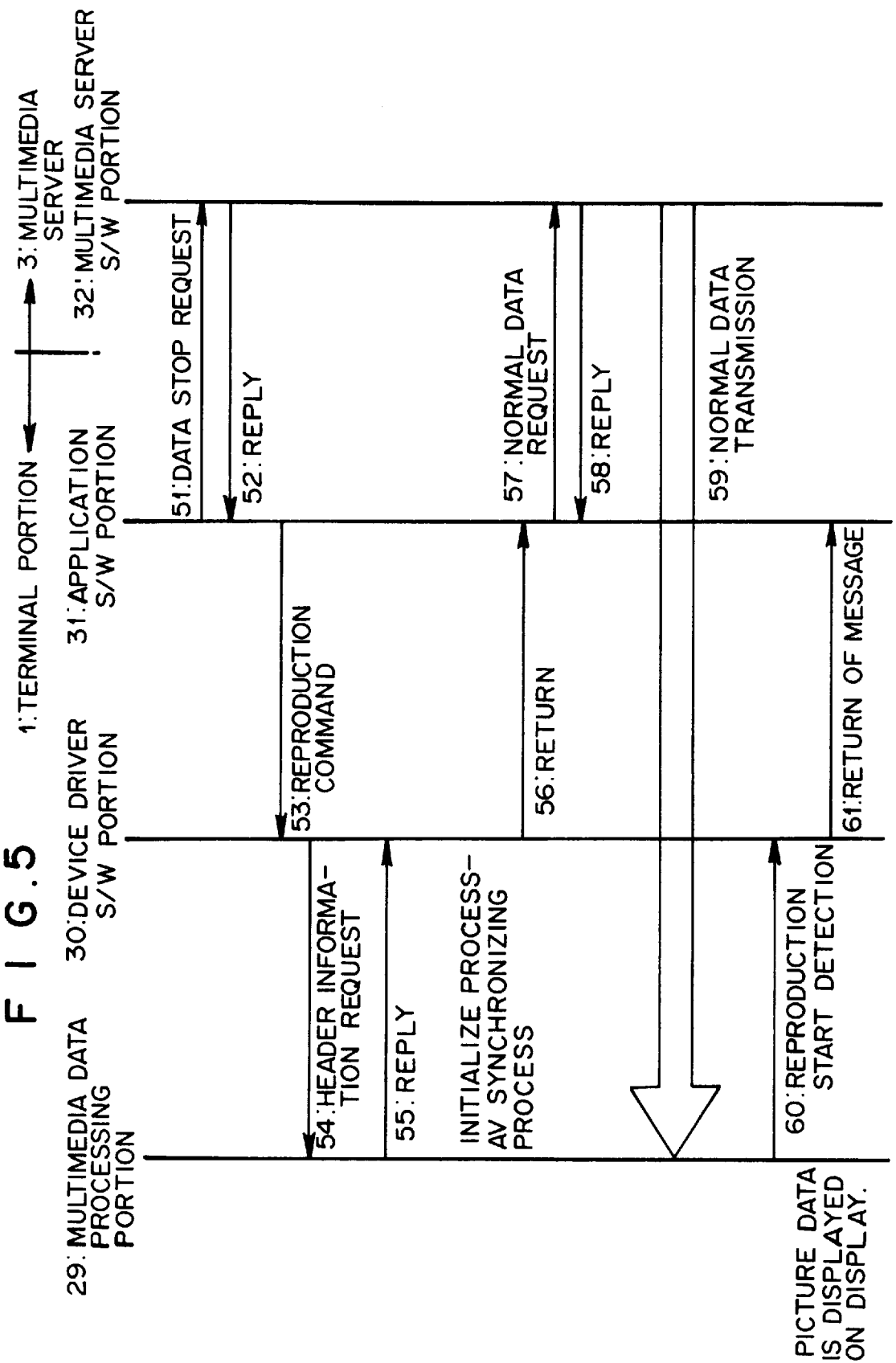

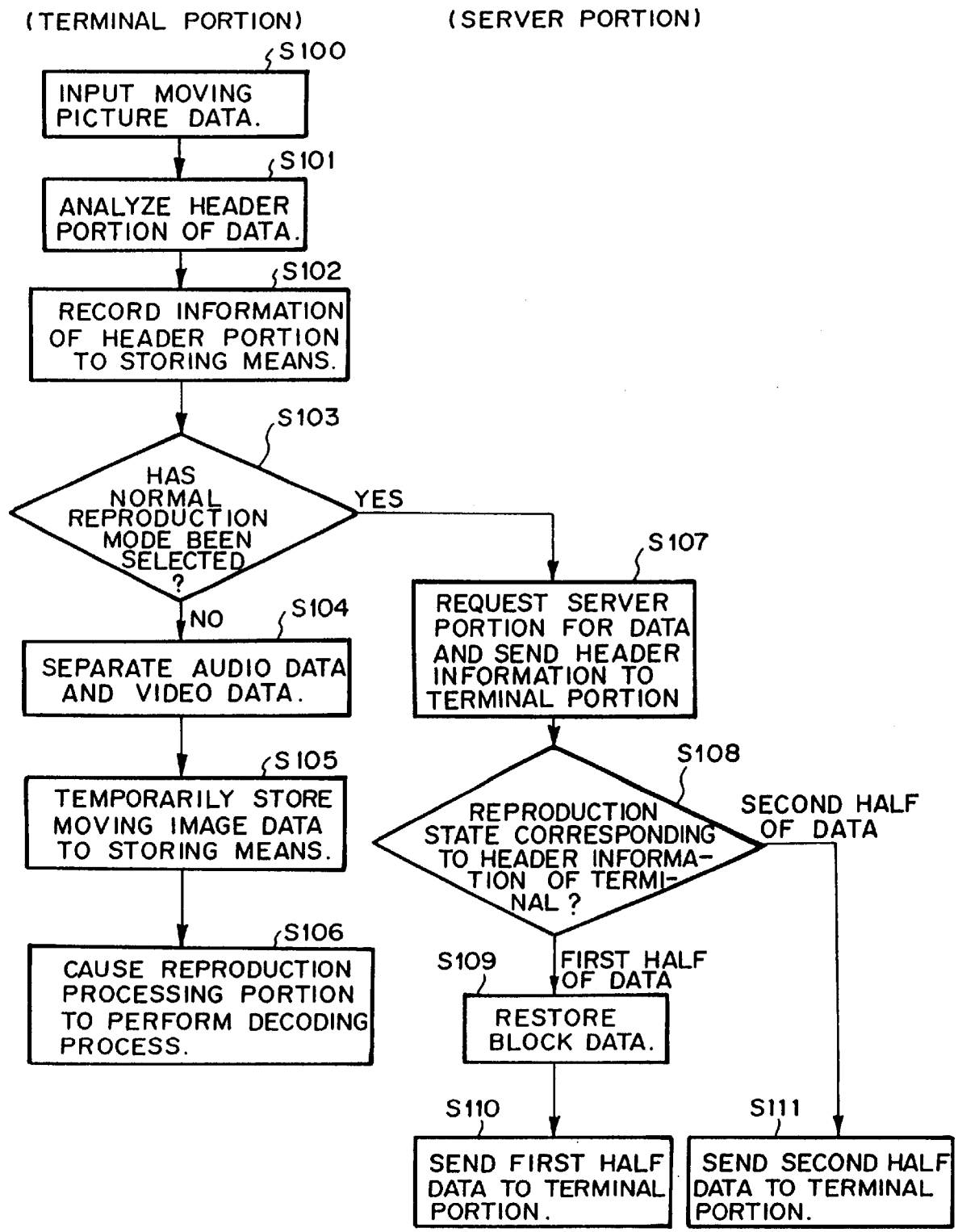
F I G. 6

MOVING PICTURE DATA REPRODUCTION CONTROLLING SYSTEM AND METHOD FOR REPRODUCING MOVING PICTURE DATA HAVING BLOCK ELEMENTS AND MINIMUM ELEMENTS EACH WITH HEADERS

BACKGROUND OF THE INVENTION

1. Field of the Invention

The present invention relates to a multimedia communication controlling system, in particular to, a moving picture reproducing system for reproducing compressed moving picture data that has been inter-frame prediction encoded in a special reproduction mode and a method thereof.

2. Description of the Related Art

As a conventional reproducing system of such moving picture data, Japanese Patent Laid-Open Publication No. 7-143477 has disclosed a motion picture data decoding system that attains smooth video display sufficiently compatible with a frame rate of a video signal by improving an average read rate of coded motion picture data from a picture file device, and that reads encoded moving picture data from the picture file device at high average read rate so as to smoothly display pictures that are satisfactorily corresponding to frames of a picture signal.

In other words, so as to prevent the frame rate from decreasing due to the necessity of setup time such as seek time in reading data from a CD-ROM or the like, a system includes a decoding means for separating moving picture data into a header portion, a timing data portion, and a picture data portion, a header detecting portion for separating the timing data portion and the picture data portion, a register for storing the timing data portion, a timer for supplying time data, and a comparing means for detecting whether or not a stored value of the register accords with the time data and controlling a read control signal corresponding to the detected result. With a start signal, the system starts reading the moving picture data from the decoding buffer. When the system detects the timing data portion, it resumes reading the moving picture data from the decoding buffer and decodes the picture data.

Thus, the system can successively read the moving picture data from the picture data file unit without stopping it. According to the related art reference, since the average read rate of the moving picture signal can be improved to the maximum read rate of the picture data file unit, picture data can be smoothly displayed corresponding to the frame rate of the picture signal.

As a second related art reference, Japanese Patent Laid-Open Publication No. 7-222109 has disclosed a reproducing apparatus for outputting a moving picture from a record medium such as a CD-ROM on which a digital moving picture has been recorded corresponding to, for example MPEG1 system. So as to decrease or increase the update speed of frames of the output picture or output the frames in the reverse direction, the reproducing apparatus comprises a reading means for reading an information sequence from a record medium with a relative motion thereof and outputting a read signal from the information sequence, a signal processing means for separating an I picture from the read signal, a position designating means for designating the position of the information sequence to be read, and a picture outputting means for outputting the separated I picture as a picture signal. The reproducing apparatus can be operated for objects of a user.

Moreover, as a third related art reference, Japanese Patent Laid-Open Publication No. 7-30893 has disclosed an apparatus such as a supervisory camera for supervising a particular position. The apparatus detects an occurrence of an event (such as an intruder) and sends a moving picture thereof for a predetermined time period after the occurrence of the event in a compressed form through a public telephone line. The apparatus successively compresses and encodes an input picture sequence of the moving picture and sends the resultant signal to a transmission line. The apparatus comprises a means for generating an intra-frame encoded picture intra-frame-encoded the moving picture, a means for generating an inter-frame encoded picture inter-frame-encoded the moving picture, a transmission buffer, and an encoding controller. When the apparatus detects an intruder, it traces the photographed moving picture back a little and sends the moving picture to the receive side so that the picture of the intruder can be accurately reproduced.

However, the related art references have the following problems.

In other words, in the conventional multimedia communication systems, when the reproduction mode is changed from a special reproduction mode such as a pause mode or a slow reproduction mode of which compressed moving picture data is reproduced to a normal reproduction mode (play mode), the reproduced picture is skipped for several frames. Next, the reason will be described.

The inter-frame prediction encoded moving picture data is composed of block data of moving picture data as minimum data elements. Each block data starts with a header that contains time stamp information and sequence information.

Conventionally, to simplify the structure of hardware, only header information of the block data is analyzed. At this point, when the reproduction mode of the apparatus is changed from the special reproduction mode (the pause mode or slow reproduction mode) to the normal reproduction mode, block data should be reproduced from the beginning so as to synchronize audio data with video data. This is because since the continuity of data is lost, the reproduction time information should be read to the decoding portion. If the normal reproduction mode is performed while the special reproduction operation is being performed, the moving picture may be skipped for one block in the worst case. In other words, when the moving picture is reproduced in the normal reproduction operation, to synchronize audio data with video data, the buffer memory disposed at the preceding stage of the decoder is initialized. Thus, the moving picture that has not been reproduced is erased. Consequently, the picture data is skipped for several frames.

SUMMARY OF THE INVENTION

The present invention is made from the above-described point of view. An object of the present invention is to provide a multimedia communication system for suppressing a reproduced picture from being skipped for several frames in changing the reproduction mode from a special reproduction mode (such as a pause mode or a slow reproduction mode) to the normal reproduction mode even if a decoding portion that reproduces compressed moving picture data has a restriction.

To accomplish the above-described object, the present invention is a moving picture data reproduction controlling system that has sequential information in association with minimum data elements of inter-frame prediction encoded compressed moving picture data.

In addition, the reproduction controlling system according to the present invention has a monitoring means for detecting the reproduction state of a moving picture on the decode side when the reproduction mode is changed from the special reproduction mode (the pause mode or the slow reproduction mode) to the normal reproduction mode, the monitoring means being disposed on the decoder side.

Moreover, the reproduction controlling system according to the present invention further comprises a means for temporarily storing data that has been sent from the server side to the decode side and a means for restoring the data and reproducing the moving picture from the data.

Since the moving picture data reproduction controlling system has the monitoring means for detecting the reproduction state of a moving picture on the decode side, when the reproduction mode is changed from the special reproduction mode (the pause state mode or the slow reproduction mode) to the normal reproduction mode, moving picture data that has higher continuity as a reproduction picture is requested to the server side. Thus, the system can prevent frames of the moving picture being skipped.

In addition, since the server side has the means for temporarily storing data that has been sent to the decode side and the means for searching the data, when the reproduction mode is changed from the special reproduction mode to the normal reproduction mode, data can be smoothly sent from the server side.

Further, the reproduction controlling apparatus of moving picture data according to the present invention further comprises a server having a pause mode, a slow motion mode, and a normal reproduction mode for reproducing moving picture data, a moving picture analyzing portion for separating the moving picture data received from said server into a header information portion, picture data, and other information, first storing means for storing sequential information of minimum data elements of the header information portion and sequential information of block data header, a second moving picture analyzing portion disposed in said server for analyzing the moving picture data reproduced in said server as block data, second storing means for storing the block data, and a block data restoring portion for restoring the block data received from said second storing means, wherein the block data received from said block data restoring portion is input corresponding to the sequential information of the minimum data elements and the sequential information of the block data header stored in said first storing means when the pause mode or the slow reproduction mode is changed to the normal reproduction mode.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 2 is a block diagram showing the structure of a system processing portion of a terminal portion according to the embodiment of the present invention;

FIG. 3 is a block diagram showing the structure of a multimedia server portion according to the embodiment of the present invention;

FIG. 4 is a schematic diagram showing an example of the format of compressed moving picture data according to the embodiment of the present invention;

FIG. 5 is a sequence chart for explaining the operation according to the embodiment of the present invention; and FIG. 6 is a flow chart for explaining the operation according to the embodiment of the present invention.

DESCRIPTION OF PREFERRED EMBODIMENT

Figure 1:
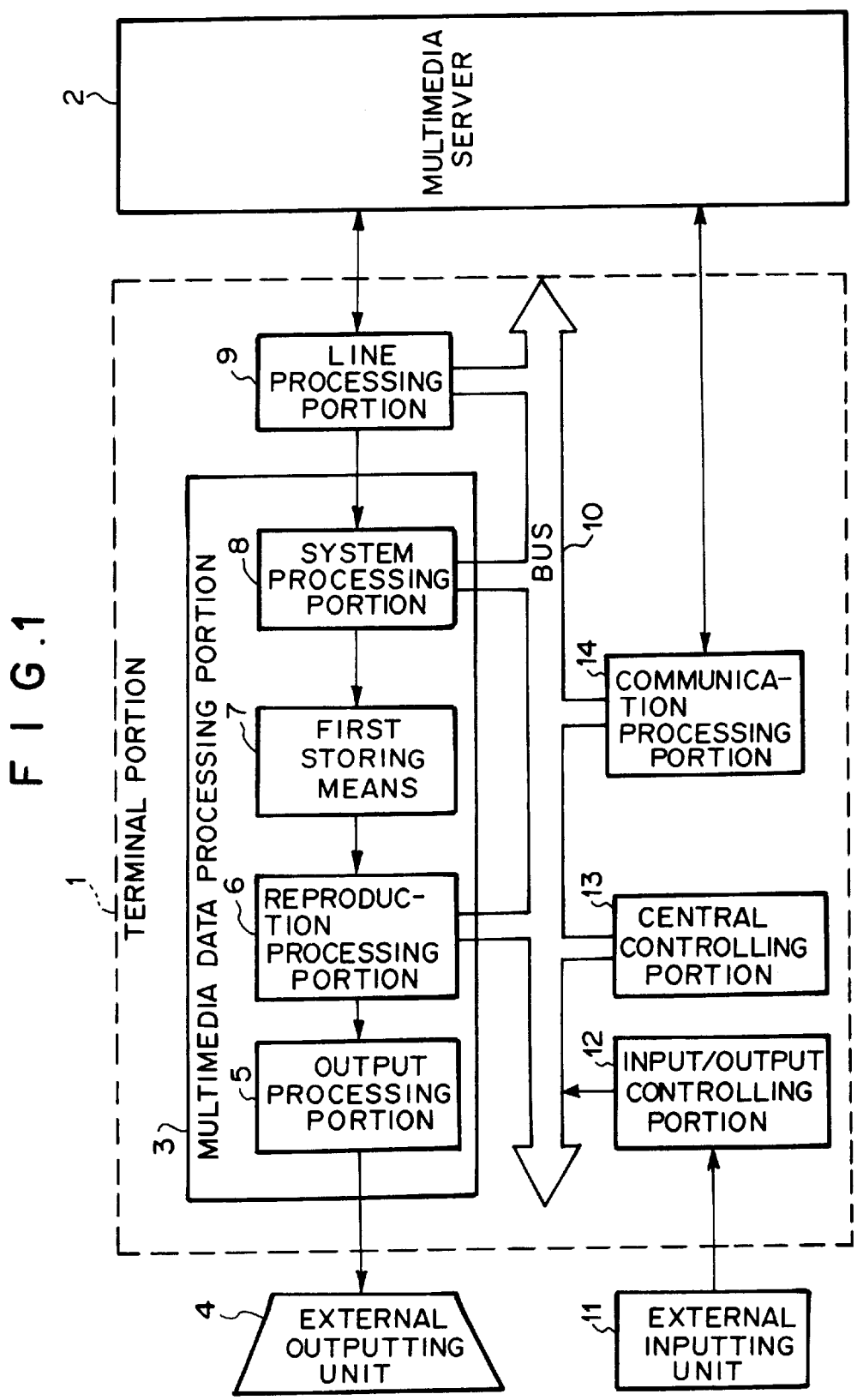
FIG. 1 is a block diagram showing the structure of a system according to an embodiment of the present invention.

Next, with reference to the accompanying drawings, an embodiment of the present invention will be described. FIG. 1 is a block diagram for explaining the entire structure of a multimedia communication system according to an embodiment of the present invention.

Referring to FIG. 1, the system according to the embodiment of the present invention comprises a multimedia server 2, a terminal portion 1, an external outputting unit 4 and an external inputting unit 11. The multimedia server 2 stores compressed moving picture data, retrieves it, and controls communication with the terminal portion 1. The terminal portion 1 controls data received from the multimedia server 2 and reproduces the data.

Data is supplied from the multimedia server 2 to a system processing portion 8 through a line processing portion 9 of the terminal portion 1. Alternatively, data is supplied from the multimedia server 2 to the system processing portion 8 through a communication processing portion 14, a bus 10, and the line processing portion 9 of the terminal portion 1. For example, as a data processing path used in a CATV (Cable TV) VOD (Video On Demand) system, compressed moving picture data is input from the line processing portion 9 to the system processing portion 8. As a data processing path used in a LAN (Local Area Network) VOD system, compressed moving picture data is input from the communication processing portion 14 to the system processing portion 8 through the bus 10.

The multimedia data processing portion 3 comprises the system processing portion 8, a first storing means 7, a reproduction processing portion (also termed a decoding portion) 6, and an output processing portion 5. The output processing portion 5 sends the reproduced moving picture to an external outputting unit 4.

The system processing portion 8 analyzes the compressed moving picture data and separates it into a unique data portion (also termed a header portion) and a reproduced moving picture portion. The system processing portion 8 analyzes the unique data portion and stores required information in a predetermined storing means. The first storing means 7 monitors only the reproduced moving picture from the separated data, temporarily stores it, monitors it, and sends it to the reproduction processing portion 6. The first storing means 7 may be composed of a FIFO (First In First Out) type buffer.

The reproduction processing portion 6 reproduces the moving picture and converts it into picture data that can be displayed on an output unit. The resultant data is supplied to the output processing portion 5. The output processing portion 5 converts the data into a proper format corresponding to the external outputting unit 4. The reproduced moving picture is displayed on the external outputting unit 4.

These processes are performed under the control of the central processing unit 13 in such a manner that after picture data is input from the external inputting unit 11, the picture data is sent from an input/output controlling portion 12 to a central controlling portion 13.

FIG. 2 shows the structure of the system processing portion 8 according to the embodiment of the present invention. Referring to FIG. 2, a first moving picture analyzing portion 15 separates the moving picture data received from the line processing portion 9 (see FIG. 1) into a header information portion, picture data, and other information.

At this point, the sequential information of minimum data element headers and sequential information of block data headers are sent to a second storing means 17.

The separated audio data and video data 16 are sent to the first storing means 7 shown in FIG. 1.

FIG. 3 is a block diagram showing a moving picture data process performed in the multimedia server 2 and the terminal portion 1. As will be described later, the multimedia server 2 has a multimedia server software portion 32 as a software controlling portion. The terminal portion 1 has a device driver software portion 30, an application software portion 31, and a multimedia data processing portion 29.

Referring to FIG. 3, in the multimedia server 2, a second moving picture data analyzing portion 18 sends moving picture data to a third storing means 20. The third storing means 20 temporarily stores block data as minimum data elements. In addition, the second moving picture data analyzing portion 18 sends the moving picture data to the terminal portion 1.

When the reproduction mode is changed from the special reproduction mode to the normal reproduction mode, if necessary, block data restored by the block data restoring portion 19 is sent to the terminal portion 1.

FIG. 4 is a schematic diagram showing a compressed moving picture data format for explaining the embodiment of the present invention.

By referring to FIG. 4, minimum picture data elements are denoted by 23, 24, and so forth. Sequential information of the header portions 25 and 26 of the minimum picture data elements 23 and 24 are successively denoted by 1, 2, . . . n. Block data 21, 22, and so forth are composed of minimum picture data. A header 27 of the block data 21, 22, and so forth stores time stamp information and sequential information.

Next, with reference to a sequence chart shown in FIG. 5, a software control performed between the multimedia server 3 and the terminal portion 1 according to the embodiment of the present invention will be described.

Referring to FIG. 5, the multimedia server software (S/W) portion 32 of the multimedia server portion 2 retrieves compressed moving picture data from the multimedia server 2 and controls communication with an application S/W portion 31. The application S/W portion 31 controls communication with the multimedia server 2 and controls data with the device driver S/W portion 30. The device driver S/W portion 30 is a software portion that controls the multimedia data processing portion 29 and commands to the application S/W portion 31. The multimedia data processing portion 29 synchronizes with the external outputting unit 4 for moving picture data corresponding to a control signal received from the device driver S/W portion 30 and outputs the moving picture data and outputs the moving picture.

Next, with reference to the sequence chart shown in FIG. 5 and a flow chart shown in FIG. 6, the operation of the embodiment of the present invention will be described. FIG. 6 shows a process performed between the terminal portion 1 and the multimedia server 2.

Referring to FIG. 6, when moving picture data is input to the terminal portion 1 (at step S100), data that is being reproduced in the special reproduction mode is input to the system processing portion 8. The moving picture data analyzing portion 15 shown in FIG. 2 analyzes the header portion of the moving picture data (at step S101).

The moving picture data analyzing portion 15 sends the sequential information of the header portion to the second storing means 17. The second storing means 17 temporarily stores the sequential information of the header portion (at step S102).

When the reproduction mode is changed from the special reproduction mode to the normal reproduction mode while the block data at time A is being reproduced (at step S103), the application S/W portion 31 sends a data stop request to the multimedia server S/W portion 32 (at step S51 shown in FIG. 5).

The multimedia server S/W portion 32 stops sending the data (the block data 21 shown in FIG. 4) that is being reproduced in the special reproduction mode and sends a reply to the application S/W portion 31 (at step S52 shown in FIG. 5).

The application S/W portion 31 sends a normal reproduction command to the device driver S/W portion 30 (at step S53 shown in FIG. 5).

The device driver S/W portion 30 requests the multimedia data processing portion 29 for the header information (at step S54 shown in FIG. 5).

The header information is temporarily stored in the second storing means 17 of the system processing portion 8 of the terminal portion 1. The device driver S/W portion 30 receives the header portion information from the second storing means 17. The multimedia data processing portion 29 performs an initialize process so that audio data and video data of the next normal reproduction data synchronize. The multimedia data processing portion 29 sends a reply of the reproduction command and the header information to the application S/W portion 31 (at steps S55 and S56).

Along with a normal reproduction data request, the application S/W portion 31 sends the header information to the multimedia server S/W portion 32 (at step S57 shown in FIG. 5 and step S107 shown in FIG. 6).

The multimedia server S/W portion 32 determines the special reproduction state of the terminal portion 1 corresponding to the header information (at step S108 shown in FIG. 6). Since the first half of the block data is being reproduced, the block data restoring portion 19 (see FIG. 3) restores the block data 21 that is close to the first half as the reproduction time (at step S109 shown in FIG. 6) and sends it to the terminal portion 1 (at step S110 shown in FIG. 6).

If the reproduction mode is changed from the special reproduction mode to the normal reproduction mode at time B shown in FIG. 4, the multimedia server S/W portion 32 determines that the last half of the block data is being reproduced in the special reproduction mode. Thus, the multimedia server S/W portion 32 sends the block data 22 that is close to time B as the normal reproduction data to the terminal portion 1 (at step S111 shown in FIG. 6).

For example, it is assumed that a block data unit of the block data is one frame of the moving picture data, and the minimum picture data element is a macroblock of 16×16 picture elements as for a MPEG1 and MPEG2 system. Further, the header portions of the macroblocks are successively denoted by 1, 2, . . . n. In this case, the multimedia server S/W portion 32 sends the block data 22 of the frame that is close to time B as the normal reproduction data to the terminal portion 1 (at step S111 shown in FIG. 6). Therefore, the picture data can be smoothly reproduced without skipping of one frame.

When the normal reproduction mode is not selected, the system processing portion 8 of the multimedia data processing portion 3 of the terminal portion 1 separates audio data and video data (at step S104 shown in FIG. 6). The separated data is temporarily stored in the first storing means 7 (at step S105 shown in FIG. 6) and the data is sent to the reproduction processing portion 6. The reproduction processing portion 6 reproduces the data (at step S106 shown in FIG. 6).

As described above, according to the present invention, when the special reproduction mode such as the pause mode or the slow reproduction mode is changed to the normal reproduction mode, picture data can be smoothly reproduced without skipping of frames.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A reproduction controlling apparatus of moving picture data, comprising:
   a server having a pause mode, a slow motion mode, and a normal reproduction mode for reproducing moving picture data;
   a terminal communicatively connected to said server;
   a first moving picture analyzing portion, disposed in said terminal, for separating the moving picture data received from the server to a header information portion, picture data, and other information;
   a separating portion, disposed in said terminal, for separating the picture data into audio data and video data;
   a first storing means, disposed in said terminal, for storing the separated audio data and video data;
   a second storing means, disposed in said terminal, for storing the header information portion and for storing block data header information;
   a second moving picture analyzing portion, disposed in said server, that analyzes the moving picture data reproduced in said server as block data;
   a third storing means, disposed in said server, for storing the block data; and
   a block data restoring portion, disposed in said server, that restores the block data received from said third storing means,
   wherein the block data received from said block data restoring portion is input to said terminal in accordance with the header information portion and the block data header information stored in said second storing means when one of the pause mode and the slow reproduction mode is changed to the normal reproduction mode.

2. The reproduction controlling apparatus as set forth in claim 1,
   wherein said server has a multimedia server software portion for communicating information with a terminal portion, and
   wherein said terminal portion comprises:
      an application software portion for communicating information with said server;
      a multimedia data processing portion for processing a signal and reproducing a picture in synchronization with an external outputting unit; and
      a device driver software portion for controlling said multimedia data processing portion and a command against said application software portion.

3. The reproduction controlling apparatus claimed as set forth in claim 1, further comprising:
   a communication processing portion for inputting the moving picture data from said server, and transmitting the moving picture data to said moving picture analyzing portion through a data processing path used in a LAN (local area network) VOD (Video on Demand) system.

4. The reproduction controlling apparatus as set forth in claim 1, further comprising:
   a line processing portion for inputting the moving picture data from said server, and transmitting the moving picture data to said moving picture analyzing portion through a data processing path in a CATV (cable television) VOD (Video on Demand) system.

5. The reproduction controlling apparatus as set forth in claim 3, wherein the moving picture data from said server is compressed moving picture data and said moving picture analyzing portion analyzes the compressed moving picture data.

6. The reproduction controlling apparatus as set forth in claim 4, wherein the moving picture data from said server is compressed moving picture data and said moving picture analyzing portion analyzes the compressed moving picture data.

7. The reproduction controlling apparatus as set forth in claim 1,
   wherein said server has a multimedia server software portion for communicating information with a terminal portion, and
   wherein said terminal portion further comprises:
      an application software portion for communicating information with said server;
      a multimedia data processing portion for processing a signal and reproducing a picture in synchronization with an external outputting unit; and
      a device driver software portion for controlling said multimedia data processing portion and for commanding against said application software portion.

8. The reproduction controlling apparatus as set forth in claim 1,
   wherein the header information comprises sequential information corresponding to each predetermined data element of compressed moving picture data which has been inter-frame prediction encoded.

9. The reproduction controlling apparatus as set forth in claim 8,
   wherein said sequential information has block data filled with a header portion and predetermined picture data elements, and wherein the predetermined picture data elements each have a sequential information which are sequentially denoted.

10. The reproduction controlling apparatus as set forth in claim 8, further comprising:
    means for monitoring a reproduction state of a moving picture on a decode side when a special reproduction mode such as a pause mode and a slow reproduction mode is changed to a normal reproduction mode; and
    means for reproducing the moving picture as normal moving picture.

11. The reproduction controlling apparatus as set forth in claim 1, further comprising:
    means for temporarily storing data which has been sent from a server side to a decode side;
    means for restoring the data; and
    means for reproducing the moving picture as normal moving picture.

12. The reproduction controlling apparatus as set forth in claim 1, further comprising:

means for detecting information which represents a moving picture which a terminal side is currently reproducing and which represents moving picture data to be sent from a server side, said means for detecting the information detecting each minimum data element of the compressed moving picture data; and means for reproducing the moving picture as normal moving picture, wherein the terminal side requests the server side for the next compressed moving picture data and the currently reproduced moving picture data.

13. The reproduction controlling apparatus as set forth in claim 4, further comprising:

wherein the information has block data filled with a header portion and predetermined picture data elements, and wherein the predetermined picture data elements each have other header portions which are sequentially denoted.

14. A reproduction controlling apparatus of moving picture data, comprising:

a server having a pause mode, a slow motion mode, and a normal reproduction mode for reproducing moving picture data;

a terminal communicatively connected to said server;

a first moving picture analyzing portion, disposed in said terminal, that separates the moving picture data received from the server to a header information portion, picture data, and other information;

a separating unit, disposed in said terminal, that separates the picture data into audio data and video data;

a first storing unit, disposed in said terminal, that stores the separated audio data and video data;

a second storing means, disposed in said terminal, that stores the header information portion and that stores block data header information;

a second moving picture analyzing portion, disposed in said server, that analyzes the moving picture data reproduced in said server as block data;

a third storing unit, disposed in said server, that stores the block data; and a block data restoring portion, disposed in said server, that restores the block data received from said third storing unit, wherein the block data received from said block data restoring portion is input to said terminal in accordance with the header information portion and the block data header information stored in said second storing unit when one of the pause mode and the slow reproduction mode is changed to the normal reproduction mode.

15. The reproduction controlling apparatus as set forth in claim 14, wherein said server has a multimedia server software portion that communicates information with a terminal portion, and wherein said terminal portion comprises:

an application software portion that communicates information with said server;

a multimedia data processing portion that processes a signal and reproduces a picture in synchronization with an external outputting unit; and h) if the determination in the step f) is no, sending to the terminal portion only a second half of the block element stored at the server portion that corresponds to the current block element.

16. A method of reproducing moving picture data, comprising:

a) inputting, at a terminal portion that is communicatively connected to a server portion, moving picture data, the moving picture data being received in a normal reproduction mode from the server portion, the moving picture data being capable of being output from the server portion in one of the normal reproduction mode, a slow motion mode, and a pause mode;

b) analyzing, at the terminal portion, a header portion of the moving picture data, wherein a separate header portion is provided for each of a plurality of block elements that make up the moving picture data;

c) storing, at the terminal portion, the header portion;

d) outputting a command to change, at the terminal portion, the reproduction mode from the normal reproduction mode to one of the slow motion mode and the pause mode;

e) outputting, by the terminal portion to the server portion, the header portion, the step e) occurring at a same time the step d) occurs;

f) determining, by the server portion, whether or not the command to change has been output by the terminal portion during a first half of a current block element being reproduced by the terminal portion;

g) if the determination in the step f) is yes, then restoring a block element stored at the server portion that corresponds to the current block element being reproduced by the terminal portion, and outputting the restored block element to the terminal portion; and h) if the determination in the step f) is no, sending to the terminal portion only a second half of the block element stored at the server portion that corresponds to the current block element.

* * * * *